Aug. 22, 1961 C. D. FOX ET AL 2,996,741
MACHINE FOR WASHING SUGAR BEETS
Filed Feb. 29, 1960 3 Sheets-Sheet 1
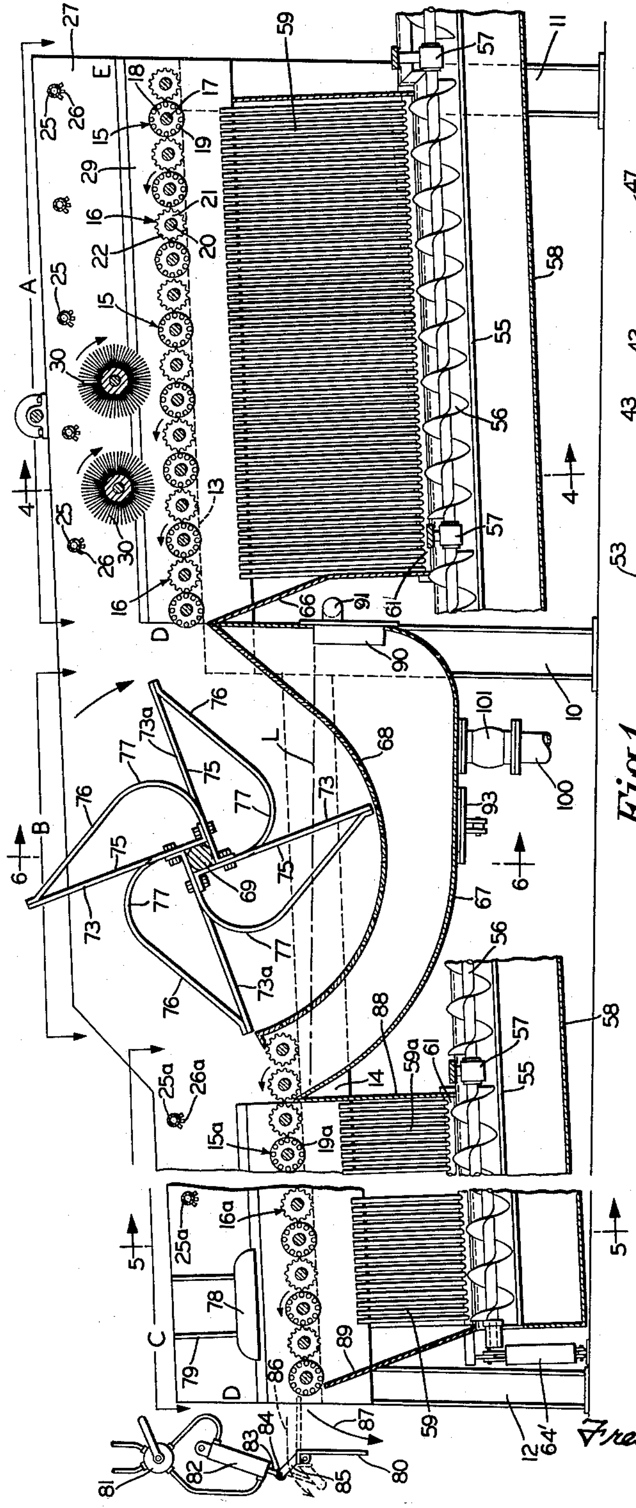
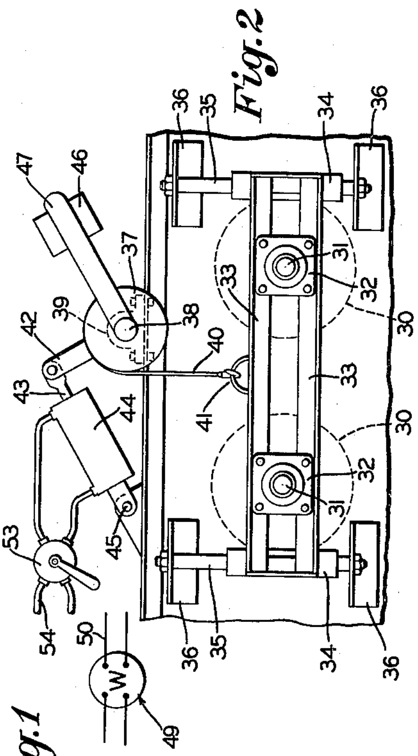
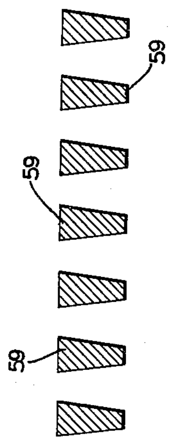
INVENTORS
Clarence D. Fox and
Joseph G. Audet
BY Frease, Bishop, Johns & Schick
ATTORNEYS INVENTORS
Clarence D. Fox and
Joseph G. Audet
BY
Frease, Bishop, Johns & Schick
ATTORNEYS

MACHINE FOR WASHING SUGAR BEETS

Filed Feb. 29, 1960

INVENTORS
Clarence D. Fox
Joseph G. Audet

BY
Frease, Bishop, Johns & Schick
ATTORNEYS

United States Patent Office 2,996,741

Patented Aug. 22, 1961

2,996,741

MACHINE FOR WASHING SUGAR BEETS

Clarence D. Fox and Joseph G. Audet, both % Quebec Sugar Refinery, St. Hilaire, Rouville County, Quebec, Canada Filed Feb. 29, 1960, Ser. No. 11,802
17 Claims. (Cl. 15—3.14)

The invention relates to apparatus for washing vegetables and more particularly to a machine for washing sugar beets and conditioning them for processing for making beet sugar therefrom.

In the manufacture of beet sugar it is necessary that the raw beets be first thoroughly washed so as to remove therefrom all traces of the earth in which they are grown. It is also desirable that the rind be scraped from the beets so as to remove the saponim and other alcohol solvent materials therefrom, before the beets are sliced and processed for making beet sugar.

The primary object of the invention is to provide an apparatus in which sugar beets may be thoroughly washed, and the rind scrubbed or scraped therefrom in a single continuous operation, so that the beets are discharged from the machine in proper condition to be cut up and processed into sugar.

Another object of the invention is to provide a machine having a series of driven rolls over which beets are continuously moved, means for spraying the moving beets with water, and rotary brushes for scrubbing the beets as they pass through the machine.

A further object of the invention is to provide such a machine in which the roller table over which the beets are moved is made up of alternate rubber covered corrugated rolls and squirrel cage rolls.

A still further object of the invention is to provide such a roller table in which the squirrel cage rolls are formed of spaced metal tubes connected at opposite ends to heads.

It is also an object of the invention to provide a beet-washing machine of the character referred to in which the rotary scrubbing brushes may be adjusted to conform to the size of the beets passing through the machine.

Another object of the invention is to provide such a machine in which the dirt and washing water is discharged to a sewer and the tailings such as rind, small pieces of broken beets, leaves and other vegetation, after being washed, are discharged from the machine in condition for use as cattle feed.

A further object of the invention is to provide a beet-washing machine of this type in which two spaced roller tables are provided with a scalding and treatment tank located therebetween and having transfer mechanism therein.

A still further object of the invention is to provide such a beet-washing machine having means therein for removing light metal objects from the beets as they pass therethrough.

The above and other objects, apparent from the drawings and following description, may be attained, the above described difficulties overcome and the advantages and results obtained, by the apparatus, construction, arrangement and combinations, sub-combinations and parts which comprise the present invention, a preferred embodiment of which, illustrative of the best mode in which applicants have contemplated applying the principle, being set forth in detail in the following description and illustrated in the accompanying drawings.

In general terms, the invention may be briefly described as comprising two separated roller tables with a scalding tank and transfer device located therebetween, and means for continuously passing beets therethrough. Each of the roller tables comprises alternate rubber covered corrugated rolls and squirrel cage rolls with means for continuously rotating all of said rolls in one direction, whereby beets may be continuously passed over said roller table.

A plurality of spray headers are located above each roller table for continuously spraying water upon the beets for washing earth therefrom as they move over the roller tables. Rotary brushes are mounted above the roller tables for scrubbing the beets as they pass over the tables, and means is provided for adjusting the brushes toward and from the table to conform to the size of beets passing through the machine.

Means is provided for automatically controlling the level of the solution in the scalding tank, and also for controlling the temperature of the solution sufficiently high to kill mesophilic soil bacteria, as well as to defrost frozen beets so as to permit better slicing thereof after discharge from the machine.

In addition to scalding water, suitable chemicals may be introduced into the tank to further reduce the bacteria, and/or to alter the composition of the skin of the beets, which contains some of the most objectionable impurities.

Transfer arms are provided in the scalding tank, arranged so that each beet will make only one passage through the tank, whereby the beets will be subjected to scalding and treatment for a specified time, and then automatically transferred to the second roller table where they are further washed and may also be further scrubbed.

Magnetic means is provided adjacent to the second roller table for removing light metal objects, such as tin cans and the like, which will tend to ride on top of the beets.

For the purpose of providing for the removal of rocks or other solid objects from the beets, the squirrel cage rolls in the second roller table may be formed of metal tubes, so that they become bell rolls. Any rocks or other solid objects striking these bell rolls will produce a ringing sound, giving a distinct warning of the rocks or the like.

A tilting plate is provided at the discharge end of the machine, which may be operated by an air control valve or the like, to divert the beets, containing rocks or other solid objects, into an inspection box where the workman can remove the foreign objects and then transfer the beets into the regular discharge stream from the machine.

Having thus briefly described the invention, reference is now made to the accompanying drawings showing a preferred embodiment of the invention, in which;

FIG. 1 is a longitudinal sectional view through a beet-washing machine constructed in accordance with the invention;

FIG. 2 is an enlarged detail sectional elevation of the rotary scrubbing brushes and mechanism for adjusting the same;

FIG. 3 is an enlarged, transverse sectional view through a portion of one of the wedge bar screens associated with the roller tables;

Reference is now made more particularly to the embodiment of the invention illustrated in the drawings, in which similar characters refer to similar parts throughout.

Figure 4:
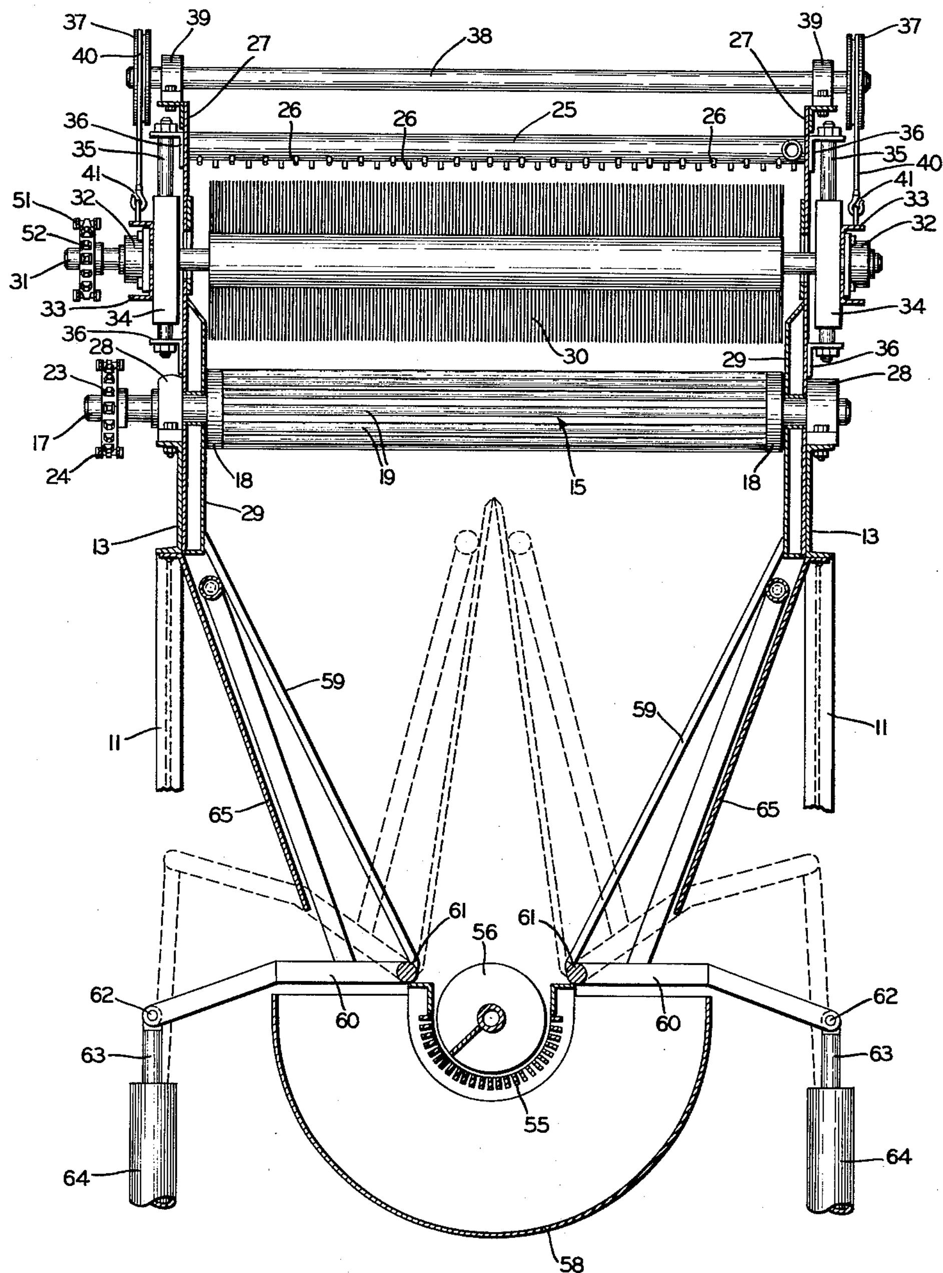
FIG. 4 is an enlarged, transverse sectional view through the first roller table and associated parts, taken on the line 4—4, FIG. 1.
Figures 5, 6:
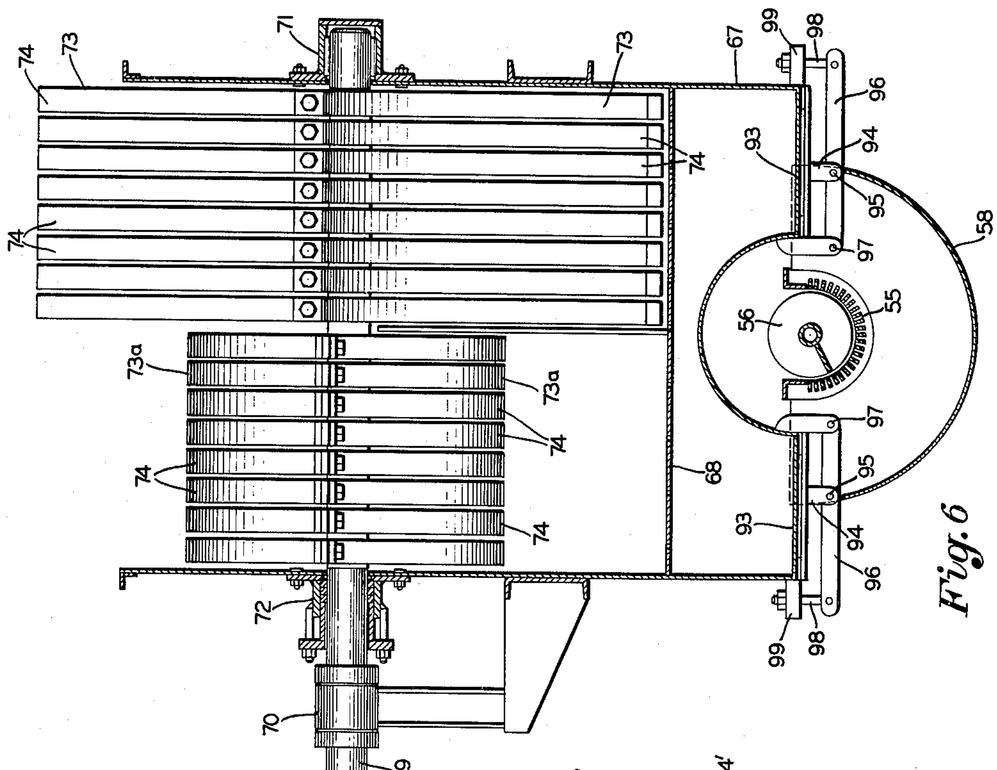
FIG. 5 is an enlarged, transverse sectional view through the second roller table and associated parts, taken on the line 5—5, FIG. 1.
FIG. 6 is a still further enlarged, transverse sectional view through the scalding tank and transfer device, taken on the line 6—6, FIG. 1.

The machine is mounted upon a structural frame including the intermediate uprights 10 and the front and rear uprights 11 and 12, which support the longitudinal frame members 13 connected at opposite ends to the upper ends of the uprights 10 and 11, and the longitudinal frame members 14 connected at their forward ends to the intermediate uprights 10, at points spaced from the upper ends thereof, and at the rear ends to the upper ends of the uprights 12.

The machine comprises generally a first roll section A and associated parts, a scalding tank and transfer device B and a second roll section C and associated parts. The roll section A comprises a roller table formed of alternate cage rolls 15 and corrugated rubber surfaced rolls 16.

Each cage roll comprises a central shaft 17 with disc heads 18 mounted near each end thereof and a plurality of spaced longitudinal rods 19 connected at opposite ends to the heads 18. Each of the rubber surfaced corrugated rolls comprises a central shaft 20 and a rubber roll 21 having spaced longitudinal corrugations 22 upon its peripheral surface.

The roller table is inclined from the entrance end E toward the discharge end D thereof, the inclination being at an angle between 0 and 10° to the horizontal, preferably between 3° and 6°. As shown on the drawings and as in actual use, this roller table has an inclination of 3°.

By means of sprocket wheels 23 upon the shafts 17 and 20 of the rolls 15 and 16 respectively, and a driven sprocket chain 24 operatively connected thereto, these rolls are all positively rotated in the direction of travel of the beets, which is in a counter-clockwise direction as viewed in FIG. 1, at a speed from 50 to 150 r.p.m., the optimum speed being 90 to 130 r.p.m. As in actual practice, the machine shown in the drawings is so constructed that these rolls have a speed of 118 r.p.m.

A plurality of spray headers 25 are located transversely of the machine, above the rolls 15 and 16, each spray header having a plurality of nozzles 26 throughout its length. Water is supplied to the spray headers 25 under pressure of 50 to 300 p.s.i., preferably within a range of 100–200 p.s.i., depending upon the condition of the beets being passed through the machine at the time.

Sheet metal side walls 27 extend upwardly from the frame members 13, at opposite ends of the rolls 15 and 16. The shafts of the rolls 15 and 16 are journalled in bearings 28 mounted upon the frame members 13. Splash guards 29 are provided at the ends of rolls 15 and 16 to prevent water from entering the bearings 28.

Rotary brushes 30 are located transversely of the machine, above the roller table A, for scrubbing the beets as they pass over the roller table. These rotary brushes are mounted so as to be adjusted vertically according to the size of the beets being washed.

For this purpose, the shafts 31 of the brushes are journalled in bearings 32 carried by the horizontal frame members 33 forming a vertically movable carriage having sliding ways 34 at each end slidable on the rods 35 supported by brackets 36 mounted upon the machine frame.

Cable drums 37 are mounted upon a shaft 38 journalled in bearings 39 carried by the machine frame, and cables 40 are attached to the drums 37 and to the carriage 33, as indicated at 41. A lever 42 is fixed upon the drum shaft 38 and connected to the piston rod 43 of the fluid cylinder 44, which is pivotally mounted at 45 upon the frame of the machine. A counter-weight 46 is adjustably mounted upon a lever 47 also fixed to the shaft 38.

A watt-meter or ammeter, indicated generally at 49, is connected to the motor circuit 50 for rotating the brushes 30 through a driven sprocket chain 51 and sprocket wheels 52 upon the shafts of the brushes.

This watt-meter or ammeter 49 indicates when to operate a valve 53 which controls the fluid pipes 54 through which the cylinder 44 is operated. Thus, the brushes 30 may be raised and lowered to accomplish a predetermined and preset brush impingement on the beets. The brushes 30 are provided with stiff bristles which may be nylon or the like.

Located some distance below the rollers 15 and 16, and extending longitudinally throughout the entire length of the machine, is a trough 55 of bar screen construction within which is mounted a helical screw conveyor 56, journalled in bearings 57 and driven by any suitable and well known mechanism (not shown) for conveying the contents of the trough 55 toward the right, as viewed in FIG. 1.

Located below the screen trough 55 is an imperforate trough 58, the lower or left hand end of which discharges into a drain pipe or sewer.

Wedge bar screens 59 are connected at their lower ends to levers 60, pivotally mounted at 61 at opposite sides of the screen trough 55, the upper ends of the screens 59 normally resting against the splash guards 29 as best shown in FIG. 4.

The levers 60 are pivotally connected at 62 to the piston rods 63 of the fluid cylinders 64. When the cylinders 64 are operated to raise the piston rods 63, the wedge bar screens 59 are moved to the broken line position shown in FIG. 4, so as to dump the contents thereof into the screen trough 55.

The cylinders 64 may be operated by manual manipulation of suitable control valves (not shown), or any usual and well known timer and programmer may be provided for manipulating the control valves at any time interval in a prescribed order.

External splash guards 65 extend downward from the frame members 13, on the outer sides of the wedge bar screens 59, to divert water coming through the rolls and wedge bar screens 59, into the waste water trough 58.

A splash shield 66 is located at the rear end of the roller table and forms a part of the splash shield system enclosing the underpart of the machine.

The section B of the machine, located between the sections A and C, comprises the beet scalding and treatment tank and transfer mechanism. This portion of the apparatus includes the scalding and treatment tank 67, provided with any usual and well known means for automatically controlling the solution level indicated at L, and with any usual and well known temperature control means for controlling the temperature of the solution.

A perforated arcuate steel plate 68 is located within the trough 67 and spaced above the bottom thereof. As the beets are discharged from the roller table in the section A they are received upon this curved perforated plate 68 and conveyed through the scalding tank and delivered to the section C by means of the transfer mechanism located in the tank.

The transfer mechanism comprises the shaft 69 located transversely of the machine and mounted in bearings 70 and 71, a seal gland 72 being located at the drive end thereof. Any usual and well known means may be provided for rotating the shaft 69 at such speed that the transfer device will convey beets through the tank at the proper speed.

The transfer mechanism is mounted upon the shaft 69 and comprises a pair of oppositely disposed transfer arms 73 and a second pair of transfer arms **73*a* located perpendicular to the arms 73** and at one side thereof so that the two sets of arms together will cover the entire width of the tank.

As shown in the drawings, each transfer arm 73 and **73*a* is preferably made up of a plurality of closely spaced fingers 74, each having a radial rear surface 75 and an inclined front surface 76 terminating toward the shaft in an arcuate portion 77**.

The transfer arms are rotated in clockwise direction, as viewed in FIG. 1, whereby the inclined surfaces 76 thereof convey the beets from right to left upon the arcuate perforate plate 68, through the scalding and treating solution, and discharge them from the left side of the tank onto the section C.

Referring now to the section C of the machine, the same comprises a roller table made up of alternate cage rolls indicated generally at 15*a* and rubber covered corrugated rolls indicated at 16*a*. These rubber covered rolls are identical with the rolls 16 in the section A, and the cage rolls 15*a* are the same as the rolls 15 in the section A, with the exception that they are formed of metal tubes 19*a* rather than solid rods as in the rolls 15.

The roller table is inclined at the same angle as the roller table in the section A and the rolls are arranged to be driven in unison at the same speed as the rolls in the section A and by mechanism similar to that above described with reference to section A.

Transversely disposed headers 25*a*, provided with nozzles 26*a*, are located above the roller table in the section C for spraying water at the same pressure as described with reference to section A, for further washing of the beets.

A bar or grate magnet 78 is suspended above this roller table at a point above the stream of beets passing thereover, by means of an adjustable mounting diagrammatically indicated at 79. The purpose of this magnet is to attract and remove light metal objects such as tin cans or the like which will tend to ride on top of the beets.

The cage rolls 15*a* with tubular bars 19*a* therein form bell rolls for the purpose of giving a distinct warning sound when rocks or other solid objects pass over them.

A hinged plate 80 is located beyond the exit end of the second roller table and normally located in the full line position shown in FIG. 1. When the machine operator hears the ring of a foreign object striking these bell cage rolls 15*a*, he may manipulate a fluid control valve 81 which controls admission of fluid to the cylinder 82.

The piston rod 83 of this cylinder is pivotally connected at 84 with a lever 85 upon the tilting plate 80. By operation of the cylinder 82 the tilting plate 80 is raised to the broken line position shown in FIG. 1 so that the beets, in which the stone or other foreign object is mixed, will be diverted over the tilting plate 80 in the direction of the broken line arrow 86 and deposited in an inspection box or the like, where the workman can locate and remove the foreign object and then transfer the beets to the regular stream, indicated by the full line arrow 87, the beets being thus discharged from the machine directly onto an elevaotr or onto any suitable conveyor system.

The construction of the section C of the machine is quite similar to that of section A. The screen trough 55 and helical screw conveyor 56 therein and the waste trough 58 extending entirely therebeneath. The rolls 15*a* and 16*a* are located at the same inclination as the rolls 15 and 16 in section A and are arranged to be driven at the same speed and by similar mechanism.

Wedge bar screens 59*a* are pivotally mounted between the rollers 15*a* and 16*a* and the screen trough 55 and arranged to be operated through the levers 60′ and piston rods 63′ of the fluid cylinders 64′ in the same manner as above described with reference to the wedge bar screens 59 in section A.

Deflector shields 65′ are located on the outer sides of the wedge bar screens 59*a* for diverting water, passing through the rolls and wedge bar screens, into the waste water trough 58. Splash shields 88 and 89 are provided at opposite ends of section C for preventing water from splashing outward.

In the operation of the machine, beets are dumped onto the roller table of section A, at the entry point indicated at E, and advance rapidly in a single layer upon said roller table. Water is continually sprayed upon the moving beets from the headers 25, and the corrugated rubber rolls, in addition to producing some scrubbing action upon the beets, assist in rapidly rotating the beets so that every portion of the beets' surfaces can be exposed to the water.

The beets pass under the rotary brushes 30 which also have a brushing or scrubbing action, tearing into or scrubbing off the rind of the beets. Although only two brushes 30 are shown in the drawings, it should be understood that the number of brushes may be increased as desired.

Also, while the rotary brushes are shown only in section A, this is merely for the purpose of illustration, and it should be understood that similar brushes may be provided in section C for producing additional scrubbing of the beets.

The water from the spray nozzles, as well as tailings comprising small pieces of broken beets, beet skins, beet leaves and other vegetation, pass downward through the cage rollers 16 and onto the wedge bar screens 59, the water passing therethrough while the tailings are accumulated upon these wedge bar screens.

When the screens are operated by the fluid cylinders 64 to the broken line position shown in FIG. 4, these tailings are dumped therefrom onto the helical screw conveyor 56, while any remaining liquid passes through the screen trough 55 into the waste water trough 58, through which the waste water and dirt are carried to the sewer or drain.

The washed and scrubbed beets pass off of the discharge end D of the roller table in section A into the scalding and treatment tank 67, being carried along the perforate curved plate 68 therein by means of the transfer arms, which operate to move the beets through the trough at the same speed at which they are moved upon the roller table.

This tank contains scalding water maintained at desired level and automatically maintained at desired temperature for the purpose of killing mesophilic soil bacteria. Also, when working with frozen beets, the scalding water quickly defrosts the beets, permitting better slicing of the same when they are discharged from the machine and processed for making beet sugar.

Any desired chemical treatment may be applied to the beets in the tank 67 to further reduce the bacteria and/or to alter the composition of the skin of the beets which contains some of the most objectionable impurities.

The tank is so designed that a minimum of chemicals will be required, and the transfer mechanism is so designed and operated that each beet will make only one passage through the tank and will thus be subject to scalding and treatment for a specified time.

A diffuser or silencer 90 may be provided for introducing steam into the scalding and treatment tank, the steam being admitted thereto as by the pipe 91.

The scalded and treated beets are discharged from the tank 67, by the transfer mechanism, onto the roller table of section C for further washing by water sprays, and, if desired, for further scrubbing by rotary brushes, and the beets are ultimately discharged from the machine directly into the beet elevator or to any suitable conveyor system leading thereto.

The tailings are carried to the right by the helical conveyor screw 56 and discharged from the right hand end thereof, free from dirt and other foreign matter and may be processed for cattle food or the like.

Clean-out doors 93 may be provided in the bottom of the scalding and treatment tank 67 for periodic cleaning of the tank and removing dirt and foreign matter therefrom. These clean-out doors are shown as provided with an arm 94, pivotally connected as at 95 to a lever 96 fulcrumed at 97 and having clamping screw 98 at the free end for locking engagement with a lug 99 upon the side of the tank. A drain pipe 100 may also be provided in the tank 67 controlled by a drain valve 101.

From the above it will be obvious that a simple, efficient machine is provided for continually passing beets therethrough, rotating the beets continually while spraying them with water so that all portions of the surfaces of the beets are washed, and scrubbing the beets as they pass over the roller table.

The beets are scalded and treated as they pass through the scalding and treatment tank, and then placed upon the second roller table where they are given further washing and scrubbing, and where metal objects, rocks and the like are removed.

All of the waste water passes down through the cage rolls and through the wedge bar screens into the waste trough, together with the earth washed from the beets, to be carried away to the sewer or drain, while tailings are carried down to the screw conveyor and discharged at the forward end of the machine.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

We claim:

1. A beet-washing machine including a roller table comprising alternate rubber covered corrugated rolls and cage rolls, means rotating said rolls to convey beets thereover, water-spraying means above the rolls, rotary scrubbing brushes spaced above the rolls, a screen trough below the rolls, a screw conveyor in said screen trough, a waste-water trough below and surrounding the sides of the screen trough, a scalding solution tank at the discharge end of the roller table, and transfer mechanism for conveying beets through the tank and discharging them therefrom.

2. A beet-washing machine including a roller table comprising alternate rubber covered corrugated rolls and cage rolls, means rotating said rolls to convey beets thereover, water-spraying means above the rolls, rotary scrubbing brushes spaced above the rolls, a screen trough below the rolls, a screw conveyor in said screen trough, screens extending downward from the sides of the roller table to the sides of the screen trough, a waste-water trough below and surrounding the sides of the screen trough, a scalding solution tank at the discharge end of the roller table, and transfer mechanism for conveying beets through the tank and discharging them therefrom.

3. A beet-washing machine including a roller table comprising alternate rubber covered corrugated rolls and cage rolls, means rotating said rolls to convey beets thereover, water-spraying means above the rolls, rotary scrubbing brushes spaced above the rolls, a screen trough below the rolls, a screw conveyor in said screen trough, screens normally extending downward from the sides of the roller table to the sides of the screen trough, means for tilting said screen to dump the contents thereof into said screen trough, a waste-water trough below and surrounding the sides of the screen trough, a scalding solution tank at the discharge end of the roller table, and transfer mechanism for conveying beets through the tank and discharging them therefrom.

4. A beet-washing machine including a roller table comprising alternate rubber covered corrugated rolls and cage rolls, means rotating said rolls to convey beets thereover, water-spraying means above the rolls, rotary scrubbing brushes spaced above the rolls, means for adjusting the height of said brushes according to the size of the beets, a screen trough below the rolls, a screw conveyor in said screen trough, a waste-water trough below and surrounding the sides of the screen trough, a scalding solution tank at the discharge end of the roller table, and transfer mechanism for conveying beets through the tank and discharging them therefrom.

5. A beet-washing machine including a roller table comprising alternate rubber covered corrugated rolls and cage rolls, means rotating said rolls to convey beets thereover, water-spraying means above the rolls, rotary scrubbing brushes spaced above the rolls, a screen trough below the rolls, a screw conveyor in said screen trough, screens extending downward from the sides of the roller table to the sides of the screen trough, a waste-water trough below and surrounding the sides of the screen trough, splash shields on the outer sides of said screens for diverting water passing through the screens into the waste-water trough, a scalding solution tank at the discharge end of the roller table, and transfer mechanism for conveying beets through the tank and discharging them therefrom.

6. A beet-washing machine including a roller table comprising alternate rubber covered corrugated rolls and cage rolls, means rotating said rolls to convey beets thereover, water-spraying means above the rolls, rotary scrubbing brushes spaced above the rolls, a screen trough below the rolls, a screw conveyor in said screen trough, a waste-water trough below and surrounding the sides of the screen trough, a scalding solution tank at the discharge end of the roller table, an arcuate perforate plate in said tank, and transfer mechanism for conveying beets through the tank upon said arcuate perforate plate and discharging them therefrom.

7. A beet-washing machine including a roller table comprising alternate rubber covered corrugated rolls and cage rolls, means rotating said rolls to convey beets thereover, water-spraying means above the rolls, rotary scrubbing brushes spaced above the rolls, a screen trough below the rolls, a screw conveyor in said screen trough, a waste-water trough below and surrounding the sides of the screen trough, a scalding solution tank at the discharge end of the roller table, and transfer mechanism for conveying beets through the tank and discharging them therefrom, said transfer mechanism comprising a rotating shaft and two pairs of transfer arms fixed upon the shaft, said pairs of arms being located side by side and disposed perpendicular to each other.

8. A beet-washing machine including two longitudinally spaced roller tables, each roller table comprising alternate rubber covered corrugated rolls and cage rolls, water-spraying means above the rolls, rotary scrubbing brushes spaced above the rolls of the first roller table, a screen trough located below said roller tables, a screw conveyor located in said screen trough, a waste-water trough below and surrounding the sides of said screen trough, a scalding solution tank located between said roller tables, transfer mechanism in said tank, and means for rotating said rolls and said transfer mechanism for conveying beets over one roller table, through said tank, and over the other roller table.

9. A beet-washing machine including two longitudinally spaced roller tables, each roller table comprising alternate rubber covered corrugated rolls and cage rolls, water-spraying means above the rolls, rotary scrubbing brushes spaced above the rolls of the first roller table, a screen trough located below said roller tables, a screw conveyor located in said screen trough, a waste-water trough below and surrounding the sides of said screen trough, a scalding solution tank located between said roller tables, transfer mechanism in said tank, and means for rotating said rolls and said transfer mechanism for conveying beets over one roller table, through said tank, and over the other roller table, and magnetic means above the last-named roller table for removing metal objects therefrom.

10. A beet-washing machine including two longitudinally spaced roller tables, each roller table comprising alternate rubber covered corrugated rolls and cage rolls, water-spraying means above the rolls, rotary scrubbing brushes spaced above the rolls of the first roller table, a screen trough located below said roller tables, a screw conveyor located in said screen trough, a waste-water trough below and surrounding the sides of said screen trough, a scalding solution tank located between said roller tables, transfer mechanism in said tank, and means for rotating said rolls and said transfer mechanism for conveying beets over one roller table, through said tank, and over the other roller table, the cage rolls in the last-named roller table being formed of metal tubes so as to give a warning sound when struck by hard objects, and means at the discharge end of said last-named roller table for diverting the beets discharged therefrom.

11. A beet-washing machine including two longitudinally spaced roller tables, each roller table comprising alternate rubber covered corrugated rolls and cage rolls, water-spraying means above the rolls, rotary scrubbing brushes spaced above the rolls of the first roller table, a screen trough located below said roller tables, a screw conveyor located in said screen trough, a waste-water trough below and surrounding the sides of said screen trough, a scalding solution tank located between said roller tables, an arcuate perforate plate in said tank, transfer mechanism in said tank, and means for rotating said rolls and said transfer mechanism for conveying beets over one roller table, through said tank upon said arcuate perforate plate, and over the other roller table.

12. A beet-washing machine including two longitudinally spaced roller tables, each roller table comprising alternate rubber covered corrugated rolls and cage rolls, water-spraying means above the rolls, rotary scrubbing brushes spaced above the rolls of the first roller table, a screen trough located below said roller tables, a screw conveyor located in said screen trough, a waste-water trough below and surrounding the sides of said screen trough, a scalding solution tank located between said roller tables, transfer mechanism in said tank, said transfer mechanism comprising a rotating shaft and two pairs of transfer arms fixed upon the shaft, said pairs of arms being located side by side and disposed perpendicular to each other, and means for rotating said rolls and said transfer mechanism for conveying beets over one roller table, through said tank, and over the other roller table.

13. A beet-washing machine including a roller table comprising alternate rubber covered corrugated rolls and cage rolls, means rotating said rolls to convey beets thereover, water-spraying means above the rolls, rotary scrubbing brushes spaced above the rolls, a screen trough below the rolls, a screw conveyor in said screen trough, wedge bar screens pivotally mounted at their lower edges at opposite sides of the screen trough, the upper edges of said wedge bar screens being normally located near opposite ends of said rolls, fluid cylinders having piston rods, and levers upon said wedge bar screens pivotally connected to said piston rods for tilting said wedge bar screens upon their pivots to dump the contents thereof into said screen trough, a waste-water trough below and surrounding the sides of the screen trough, a scalding solution tank at the discharge end of the roller table, and transfer mechanism for conveying beets through the tank and discharging them therefrom.

14. A beet-washing machine including two longitudinally spaced roller tables, each roller table comprising alternate rubber covered corrugated rolls and cage rolls, water-spraying means above the rolls, rotary scrubbing brushes spaced above the rolls of the first roller table, means for adjusting the height of said brushes according to the size of the beets, a screen trough located below said roller tables, a screw conveyor located in said screen trough, a waste-water trough below and surrounding the sides of said screen trough, a scalding solution tank located between said roller tables, transfer mechanism in said tank, and means for rotating said rolls and said transfer mechanism for conveying beets over one roller table, through said tank, and over the other roller table.

15. A beet-washing machine including two longitudinally spaced roller tables, each roller table comprising alternate rubber covered corrugated rolls and cage rolls, water-spraying means above the rolls, rotary scrubbing brushes spaced above the rolls of the first roller table, a screen trough located below said roller tables, a screw conveyor located in said screen trough, screens extending downward from the sides of the roller tables to the sides of the screen trough, a waste-water trough below and surrounding the sides of said screen trough, a scalding solution tank located between said roller tables, transfer mechanism in said tank, and means for rotating said rolls and said transfer mechanism for conveying beets over one roller table, through said tank, and over the other roller table.

16. A beet-washing machine including two longitudinally spaced roller tables, each roller table comprising alternate rubber covered corrugated rolls and cage rolls, water-spraying means above the rolls, rotary scrubbing brushes spaced above the rolls of the first roller table, a screen trough located below said roller tables, a screw conveyor located in said screen trough, screens normally extending downward from the sides of the roller tables to the sides of the screen trough, means for tilting said screens to dump the contents thereof into said screen trough, a waste-water trough below and surrounding the sides of said screen trough, a scalding solution tank located between said roller tables, transfer mechanism in said tank, and means for rotating said rolls and said transfer mechanism for conveying beets over one roller table, through said tank, and over the other roller table.

17. A beet-washing machine including two longitudinally spaced roller tables, each roller table comprising alternate rubber covered corrugated rolls and cage rolls, water-spraying means above the rolls, rotary scrubbing brushes spaced above the rolls of the first roller table, a screen trough located below said roller tables, a screw conveyor located in said screen trough, screens extending downward from the sides of the roller tables to the sides of the screen trough, a waste-water trough below and surrounding the sides of said screen trough, splash shields on the outer sides of said screens for diverting water passing through the screens into the waste-water trough, a scalding solution tank located between said roller tables, transfer mechanism in said tank, and means for rotating said rolls and said transfer mechanism for conveying beets over one roller table, through said tank, and over the other roller table.

References Cited in the file of this patent

UNITED STATES PATENTS

| | | |
|---|---|---|
| 1,952,429 | Ghent et al. | Mar. 27, 1934 |
| 2,391,630 | Kibler | Dec. 25, 1945 |
| 2,624,458 | Molnau | Jan. 8, 1953 |

FOREIGN PATENTS

| | | |
|---|---|---|
| 14,901 | Germany | Aug. 26, 1881 |